United States Patent
Olson et al.

(10) Patent No.: US 8,211,373 B2
(45) Date of Patent: Jul. 3, 2012

(54) MOUNTING MAT WITH FLEXIBLE EDGE PROTECTION AND EXHAUST GAS TREATMENT DEVICE INCORPORATING THE MOUNTING MAT

(75) Inventors: James R. Olson, Lewiston, NY (US); John D. Ten Eyck, Lewiston, NY (US); Patrick J. Gadzo, Lake View, NY (US)

(73) Assignee: Unifrax I LLC, Niagara Falls, NY (US)

( * ) Notice: Subject to any disclaimer, the term of this patent is extended or adjusted under 35 U.S.C. 154(b) by 405 days.

(21) Appl. No.: 12/550,100

(22) Filed: Aug. 28, 2009

(65) Prior Publication Data
US 2010/0055004 A1      Mar. 4, 2010

Related U.S. Application Data

(60) Provisional application No. 61/093,047, filed on Aug. 29, 2008.

(51) Int. Cl.
*B01D 50/00* (2006.01)
(52) U.S. Cl. .................................... 422/179
(58) Field of Classification Search .............. 422/179, 422/180
See application file for complete search history.

(56) References Cited

U.S. PATENT DOCUMENTS

| | | |
|---|---|---|
| 3,224,927 A | 12/1965 | Brown et al. |
| 3,649,406 A | 3/1972 | McNish |
| 3,771,967 A | 11/1973 | Nowak |
| 3,798,006 A | 3/1974 | Balluff |
| 3,861,881 A | 1/1975 | Nowak |
| 3,916,057 A | 10/1975 | Hatch et al. |
| 3,996,145 A | 12/1976 | Hepburn |
| 4,048,363 A | 9/1977 | Langer et al. |
| 4,093,423 A | 6/1978 | Neumann |

(Continued)

FOREIGN PATENT DOCUMENTS

DE          196 38 542 A1      3/1997

(Continued)

OTHER PUBLICATIONS

English language abstract of DE 19858025; Publication Date: Jun. 21, 2000; Applicant: Aslgawo GmbH.

(Continued)

*Primary Examiner* — Tom Duong
(74) *Attorney, Agent, or Firm* — Curatolo Sidoti Co., LPA; Joseph G. Curatolo; Salvatore A. Sidoti

(57) ABSTRACT

A mounting mat for an exhaust gas treatment device includes first and second major opposite facing surfaces, leading and trailing edges, and opposite lateral edges. At least a portion of one or both of the opposite lateral edges includes an edge protectant that protects the mounting mat against erosion from hot gases encountered during the normal operation of the exhaust gas treatment device. The edge protectant remains flexible after it has been applied to the mounting mat and substantially dried. Also disclosed is an exhaust gas treatment device that includes a housing and a fragile structure mounted within the housing by the mounting mat having the edge protectant deposited thereon. Additionally disclosed are methods of making the mounting mat and an exhaust gas treatment device.

57 Claims, 3 Drawing Sheets

U.S. PATENT DOCUMENTS

| | | | |
|---|---|---|---|
| 4,101,280 A | 7/1978 | Frietzsche et al. | |
| 4,142,864 A | 3/1979 | Rosynsky et al. | |
| 4,156,533 A | 5/1979 | Close et al. | |
| 4,204,907 A | 5/1980 | Korklan et al. | |
| 4,239,733 A | 12/1980 | Foster et al. | |
| 4,269,807 A | 5/1981 | Bailey et al. | |
| 4,271,228 A | 6/1981 | Foster et al. | |
| 4,279,864 A | 7/1981 | Nara et al. | |
| 4,305,992 A | 12/1981 | Langer et al. | |
| 4,328,187 A | 5/1982 | Musall et al. | |
| 4,332,852 A | 6/1982 | Korklan et al. | |
| 4,335,077 A | 6/1982 | Santiago et al. | |
| 4,353,872 A | 10/1982 | Midorikawa | |
| 4,385,135 A | 5/1983 | Langer et al. | |
| 4,617,176 A | 10/1986 | Merry | |
| 4,693,338 A | 9/1987 | Clerc | |
| 4,735,757 A | 4/1988 | Yamamoto et al. | |
| 4,746,570 A | 5/1988 | Suzaki et al. | |
| 4,752,515 A | 6/1988 | Hosoi et al. | |
| 4,797,263 A | 1/1989 | Oza | |
| 4,863,700 A | 9/1989 | Ten Eyck | |
| 4,865,818 A | 9/1989 | Merry et al. | |
| 4,927,608 A | 5/1990 | Wörner et al. | |
| 4,929,429 A | 5/1990 | Merry | |
| 4,985,212 A | 1/1991 | Kawakami et al. | |
| 4,999,168 A | 3/1991 | Ten Eyck | |
| 5,008,086 A | 4/1991 | Merry | |
| 5,032,441 A | 7/1991 | Ten Eyck et al. | |
| 5,073,432 A | 12/1991 | Horikawa et al. | |
| 5,079,280 A | 1/1992 | Yang et al. | |
| 5,094,073 A | 3/1992 | Wörner et al. | |
| 5,094,074 A | 3/1992 | Nishizawa et al. | |
| 5,119,551 A | 6/1992 | Abbott | |
| 5,145,811 A | 9/1992 | Lintz et al. | |
| 5,151,253 A | 9/1992 | Merry et al. | |
| 5,225,170 A | 7/1993 | Kolk et al. | |
| 5,242,871 A | 9/1993 | Hashimoto et al. | |
| 5,250,269 A | 10/1993 | Langer | |
| 5,254,410 A | 10/1993 | Langer et al. | |
| 5,258,216 A | 11/1993 | Von Bonin et al. | |
| 5,290,522 A | 3/1994 | Rogers et al. | |
| 5,332,609 A | 7/1994 | Corn | |
| 5,332,699 A | 7/1994 | Olds et al. | |
| 5,340,643 A | 8/1994 | Ou et al. | |
| 5,346,868 A | 9/1994 | Eschner | |
| 5,376,341 A | 12/1994 | Gulati | |
| 5,380,580 A | 1/1995 | Rogers et al. | |
| 5,384,188 A | 1/1995 | Lebold et al. | |
| 5,389,716 A | 2/1995 | Graves | |
| 5,453,116 A | 9/1995 | Fischer et al. | |
| 5,482,686 A | 1/1996 | Lebold et al. | |
| 5,488,826 A | 2/1996 | Paas | |
| 5,523,059 A | 6/1996 | Langer | |
| 5,580,532 A | 12/1996 | Robinson et al. | |
| 5,585,312 A | 12/1996 | Ten Eyck et al. | |
| 5,666,726 A | 9/1997 | Robinson et al. | |
| 5,714,421 A | 2/1998 | Olds et al. | |
| 5,736,109 A | 4/1998 | Howorth et al. | |
| 5,811,063 A | 9/1998 | Robinson et al. | |
| 5,811,360 A | 9/1998 | Jubb | |
| 5,821,183 A | 10/1998 | Jubb | |
| 5,853,675 A | 12/1998 | Howorth | |
| 5,862,590 A | 1/1999 | Sakashita et al. | |
| 5,869,010 A | 2/1999 | Langer | |
| 5,874,375 A | 2/1999 | Zoitos et al. | |
| 5,882,608 A | 3/1999 | Sanocki et al. | |
| 5,928,975 A | 7/1999 | Jubb | |
| 5,955,177 A | 9/1999 | Sanocki et al. | |
| 5,955,389 A | 9/1999 | Jubb et al. | |
| 6,000,131 A | 12/1999 | Schmitt | |
| 6,025,288 A | 2/2000 | Zoitos et al. | |
| 6,030,910 A | 2/2000 | Zoitos et al. | |
| 6,051,193 A | 4/2000 | Langer et al. | |
| 6,101,714 A | 8/2000 | Schmitt | |
| 6,158,120 A | 12/2000 | Foster et al. | |
| 6,162,404 A | 12/2000 | Tojo et al. | |
| 6,183,852 B1 | 2/2001 | Rorabaugh et al. | |
| 6,231,818 B1 | 5/2001 | TenEyck | |
| 6,245,301 B1 | 6/2001 | Stroom et al. | |
| 6,317,976 B1 | 11/2001 | Aranda et al. | |
| 6,458,418 B2 | 10/2002 | Langer et al. | |
| 6,589,488 B1 | 7/2003 | Eyhorn | |
| 6,613,294 B2 | 9/2003 | Sanocki et al. | |
| 6,726,884 B1 | 4/2004 | Dillon et al. | |
| 6,737,146 B2 | 5/2004 | Schierz et al. | |
| 6,756,107 B1 | 6/2004 | Schierz et al. | |
| 6,855,298 B2 | 2/2005 | TenEyck | |
| 6,861,381 B1 | 3/2005 | Jubb et al. | |
| 6,923,942 B1 | 8/2005 | Shirk et al. | |
| 6,953,757 B2 | 10/2005 | Zoitos et al. | |
| 6,967,006 B1 | 11/2005 | Wirth et al. | |
| 7,033,412 B2 | 4/2006 | Kumar et al. | |
| 7,153,796 B2 | 12/2006 | Jubb et al. | |
| 7,259,118 B2 | 8/2007 | Jubb et al. | |
| 7,261,864 B2 | 8/2007 | Watanabe | |
| 7,387,822 B2 | 6/2008 | Dinwoodie | |
| 7,550,118 B2 | 6/2009 | Merry | |
| 7,820,117 B2 | 10/2010 | Peisert et al. | |
| 7,887,917 B2 | 2/2011 | Zoitos et al. | |
| 7,971,357 B2 | 7/2011 | Ten Eyck et al. | |
| 2001/0036427 A1 | 11/2001 | Yamada et al. | |
| 2002/0025904 A1 | 2/2002 | Goto et al. | |
| 2002/0127154 A1 | 9/2002 | Foster et al. | |
| 2003/0049180 A1 | 3/2003 | Fukushima | |
| 2003/0185724 A1 | 10/2003 | Anji et al. | |
| 2004/0052694 A1 | 3/2004 | Nishikawa et al. | |
| 2004/0234436 A1 | 11/2004 | Howorth | |
| 2005/0272602 A1 | 12/2005 | Ninomiya | |
| 2006/0153746 A1 | 7/2006 | Merry et al. | |
| 2006/0154040 A1 | 7/2006 | Merry | |
| 2006/0278323 A1 | 12/2006 | Eguchi | |
| 2007/0065349 A1 | 3/2007 | Merry | |
| 2007/0207069 A1 | 9/2007 | Kariya et al. | |
| 2008/0178566 A1 | 7/2008 | Okabe | |
| 2008/0253939 A1 | 10/2008 | Hornback | |
| 2009/0041967 A1* | 2/2009 | Tomosue et al. | 428/36.8 |
| 2009/0060800 A1 | 3/2009 | Fernandez | |
| 2009/0114907 A1 | 5/2009 | Nakamura | |

FOREIGN PATENT DOCUMENTS

| | | |
|---|---|---|
| EP | 0 205 704 A1 | 12/1986 |
| EP | 0 319 299 A2 | 6/1989 |
| EP | 0 508 751 A1 | 10/1992 |
| EP | 0 551 532 A1 | 7/1993 |
| EP | 0 639 700 A1 | 2/1995 |
| EP | 0 639 701 A1 | 2/1995 |
| EP | 0 639 702 A1 | 2/1995 |
| EP | 0 643 204 A2 | 3/1995 |
| EP | 0 765 993 A1 | 4/1997 |
| EP | 0 803 643 A1 | 10/1997 |
| EP | 1 495 807 A1 | 1/2005 |
| EP | 1 696 110 A1 | 8/2006 |
| EP | 1 905 895 A1 | 4/2008 |
| EP | 1 950 035 A1 | 7/2008 |
| EP | 1 931 862 B1 | 7/2009 |
| GB | 1 438 762 A | 6/1976 |
| GB | 1 513 808 A | 6/1978 |
| GB | 2 200 129 A | 7/1988 |
| JP | 4-083773 | 3/1992 |
| JP | 6-272549 | 9/1994 |
| JP | 7-286514 | 10/1995 |
| WO | WO 91/11498 A1 | 8/1991 |
| WO | WO 97/32118 A1 | 9/1997 |
| WO | WO 99/23370 A1 | 5/1999 |
| WO | WO 99/46028 A1 | 9/1999 |
| WO | WO 00/75496 A1 | 4/2000 |
| WO | WO 02/053511 A1 | 7/2001 |
| WO | WO 01/65008 A1 | 9/2001 |
| WO | WO 01/83956 A1 | 11/2001 |
| WO | WO 02/33233 A1 | 4/2002 |
| WO | WO 03/000414 A1 | 1/2003 |
| WO | WO 03/031368 A2 | 4/2003 |
| WO | WO 2005/105427 A1 | 11/2005 |
| WO | WO 2006/065534 A1 | 6/2006 |
| WO | WO 2008/103525 A2 | 8/2008 |
| WO | WO 2008/154078 A1 | 12/2008 |
| WO | WO 2008/156942 A1 | 12/2008 |

OTHER PUBLICATIONS

Tosa Shin'Ichi, et al., "The Development of Converter Canning Technology for Thin Wall Substrate." Honda R&D Tech. Rev., vol. 12, No. 1, pp. 175-182, Japan (2000).
Product Brochure—"There's More to it Than You Think. HDK—Pyrogenic Silica", Wacker Silicones, 6173/10.05/e, Oct. 2005.
Technical Data Sheet—"HDK N20 Pyrogenic Silica", Wacker Silicones, Version 1.0, Jun. 12, 2008.
Gulati, Ten Eyck & Lebold. "Durable Packaging Design for Cordierite Ceramic Catalysts for Motorcycle Application" Society of Automotive Engineers Meeting, Detroit, MI, Mar. 1, 1993.
Maret, Gulati, Lambert & Zink. Systems Durability of a Ceramic Racetrack Converter. International Fuels and Lubricants Meeting, Toronto, Canada, Oct. 7-10, 1991.
Search Report under Section 17, for Application No. GB 1014735.3, date of search Dec. 7, 2010.
International Search Report for PCT/US2009/04899.
Written Opinion of the International Searching Authority for PCT/US2009/04899.

* cited by examiner

MOUNTING MAT WITH FLEXIBLE EDGE PROTECTION AND EXHAUST GAS TREATMENT DEVICE INCORPORATING THE MOUNTING MAT

CROSS REFERENCE TO RELATED APPLICATIONS

This application claims the benefit of the filing date under 35 U.S.C. §119(e) of U.S. Provisional Application No. 61/093,047 filed Aug. 29, 2008, which is hereby incorporated by reference.

TECHNICAL FIELD

Provided is a mounting mat for mounting a fragile structure within the housing of an exhaust gas treatment device, such as a catalytic converter or diesel particulate trap. An exhaust gas treatment device that includes a fragile structure that is mounted within a housing by the mounting mat disposed in a gap between the housing and the fragile structure is also provided.

BACKGROUND

Exhaust gas treatment devices are used on automobiles to reduce pollution from engine exhaust gas emissions. Examples of common exhaust gas treatment devices include catalytic converters and diesel particulate traps.

A catalytic converter for treating exhaust gases of an automotive engine typically includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to hold the fragile catalyst support structure within the housing during operation.

A diesel particulate trap for controlling pollution generated by diesel engines typically includes a housing, a fragile particulate filter or trap for collecting particulate from the diesel engine emissions, and a mounting mat that is disposed between the outer surface of the filter or trap and the inner surface of the housing to hold the fragile filter or trap structure within the housing during operation.

The fragile structure, either the catalyst support structure or diesel particulate filter, is contained within the housing with a space or gap between the exterior surface of the fragile structure and the inner surface of the housing. The fragile structure generally comprises a structure manufactured from a frangible material of a brittle, ceramic material such as aluminum oxide, aluminum titanate, silicon dioxide, magnesium oxide, zirconia, cordierite, silicon carbide and the like. These materials provide a skeleton type of structure with a plurality of gas flow channels. These structures can be so fragile that small shock loads or stresses are often sufficient to crack or crush them. In order to protect the fragile structure from thermal and mechanical shock and other stresses encountered during normal operation of the device, as well as to provide thermal insulation and an effective gas seal, the mounting or support mat material is positioned within the gap between the fragile structure and the housing.

The mounting mat materials employed should be capable of satisfying any of a number of design or physical requirements set forth by the fragile structure manufacturers or the exhaust gas treatment device manufacturers. For example, the mounting mat material should be capable of exerting an effective residual holding pressure on the fragile structure, even when the exhaust gas treatment device has undergone wide temperature fluctuations, which causes significant expansion and contraction of the metal housing in relation to the fragile structure, which in turn causes significant compression and release cycles for the mounting mats over a period of time.

There are typically two types of mounting mats which may be used in exhaust gas treatment devices, namely, intumescent and non-intumescent mounting mats. Intumescent mounting mats contain materials which expand in response to the application of heat. The use of intumescent materials in mounting mats depends upon the intended application and the conditions under which the mounting mats are to be subjected. Non-intumescent mounting mats are substantially non-expanding. By "substantially non-expanding" is meant that the mat does not readily expand upon the application of heat as would be expected with intumescent mats. Of course, some expansion of the mat does occur based upon its coefficient of thermal expansion. The amount of expansion, however, is very insubstantial as compared to the expansion of intumescent mats.

All mounting mats are subject to edge erosion when incorporated within an exhaust gas treatment device. Hot emission gas generated by an internal combustion engine, passes through an exhaust pipe before entering the exhaust gas treatment device. In passing through the exhaust pipe, these emissions must enter an inlet region and exit through an outlet region of the exhaust gas treatment device. The leading and trailing edges of the mounting mat of the exhaust gas treatment device are exposed to these hot gases, which in turn causes, degradation of the mounting mat edges.

Both intumescent and non-intumescent mounting mats are not always resistant to hot gas edge erosion. Improper installation of the support mat or a lack of holding force of the mounting mat within the housing may result in support mat erosion. Moreover, depending on the particular application, utilizing a non-intumescent mounting mat within an exhaust gas treatment device may provide insufficient protection and support to the exhaust gas treatment device. With respect to intumescent mats, it is known to bind a distinct narrow strip of non-intumescent mat to the edge of an intumescent mat in order to provide edge protection. However, this is a relatively expensive and complex procedure as it involves physically attaching two separate components together, namely, the mounting mat and the strip of non-intumescent mat, to each other.

Various methods of edge protection exist for intumescent mats. High-temperature resistant cloths and rigidizing solutions have also been used in an attempt to mitigate the problems of edge erosion. The use of high-temperature resistant cloths, for example, entails wrapping the edges of the mat to improve the resistance to gas erosion. The cloth edge treatment protects the mat's leading and trailing edge. Because of the complexities involved with fitting a mounting mat wrapped with high-temperature resistant cloth into the housing, the use of separate high-temperature resistant cloths is not a highly accepted solution.

It is further known to add a high-temperature rigidizing solution to a mounting mat that is disposed between a catalyst support element and a metal housing. The high-temperature rigidizing solution material may be added either before or after the mounting mat is assembled within the metal shell. Rigidizing solutions, while very effective, must be applied by the end user during the canning operation and are messy products to apply to the mounting mat. Furthermore, application of a rigidizing solution to the mounting mat prior to its assembly around the fragile structure is impossible, because the solution dries very hard and renders the mounting mat too stiff to be wrapped around the fragile catalyst support structure.

SUMMARY

Provided is a mounting mat for an exhaust gas treatment device comprising a mat of inorganic fibers comprising first and second major opposite facing surfaces, leading and trailing edges, and opposite lateral edges, wherein at least a portion of at least one of said opposite lateral edges includes a substantially dry flexible edge protectant comprising a polymer and a gas erosion resisting agent adsorbed thereon.

Also provided is an exhaust gas treatment device comprising a housing, a mat of inorganic fibers comprising first and second major opposite facing surfaces, leading and trailing edges, and opposite lateral edges, wherein at least a portion of at least one of said opposite lateral edges includes a substantially dry flexible edge protectant comprising a polymer and a gas erosion resisting agent adsorbed thereon, and a fragile catalyst support structure resiliently mounted within said housing by said mounting mat.

Additionally provided is a method of making a mounting mat for an exhaust gas treatment device comprising applying a liquid flexible edge protectant comprising polymer and a gas erosion resisting agent to a least a portion of at least one edge of mounting mat comprising inorganic fibers, and removing at least a portion of said liquid from said edge protectant.

Further provided is a method of making an exhaust gas treatment device comprising wrapping at least a portion of a fragile catalyst structure adapted to treat exhaust gases with the mounting mat described herein; and disposing the wrapped fragile structure within a housing.

DETAILED DESCRIPTION

A mounting mat for exhaust gas treatment device applications is disclosed. The mounting mat includes at least one ply or sheet that is comprised of heat resistant inorganic fibers and a flexible edge protectant treatment. According to certain embodiments, the mounting mat includes at least one ply or sheet that is comprised of heat resistant inorganic fibers, intumescent material, and a flexible edge protectant treatment. It has surprisingly and unexpectedly been found that the inclusion of a flexible edge protectant treatment eliminates the need for attaching a separate edge protectant material adjacent to the leading and trailing edges of a mounting mat in order to protect the mounting mat from erosion due to hot emission gases. The edge protectant treatment, after being applied to the mat and substantially dried, the mounting mat retains much of its original flexibility to enable it to be wrapped about a catalyst support structure and therefore overcomes the problems associated with edge protectant solutions that rigidize the mounting mat.

Figure 1:
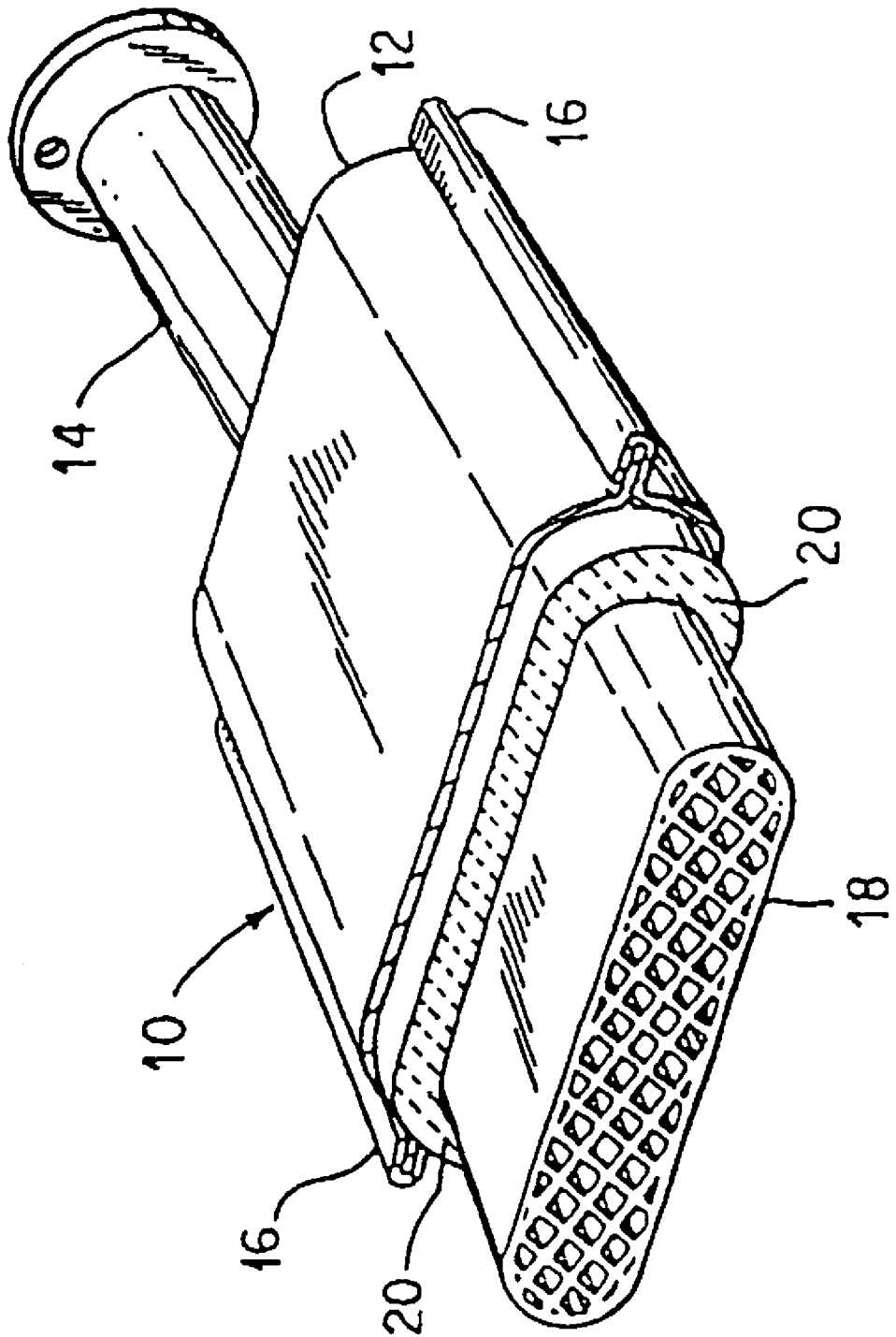
FIG. 1 shows a cross-sectional view of an exhaust gas treatment device containing a mounting mat treated with flexible edge protectant.

Also provided is a device for treating exhaust gases having a fragile catalyst support structure mounted within a housing that is supported therein by a mounting mat disposed between the housing and the fragile structure. The term "fragile structure" is intended to mean and include catalyst support structures, such as metal or ceramic monoliths or the like, which may be fragile or frangible in nature, and would benefit from a mounting mat such as is described herein. An illustrative exhaust gas treatment device is shown in FIG. 1. It should be understood that the exhaust gas treatment device is not intended to be limited to use in the catalytic converter shown in FIG. 1, and so the shape is shown only as an illustrative embodiment. In fact, the mounting mat could be used to mount or support any fragile structure suitable for treating exhaust gases, such as a diesel catalyst structure, a diesel particulate trap, NOx traps, and the like.

Catalyst support structures generally include one or more porous tubular or honeycomb-like structures mounted by a thermally resistant material within a housing. Each structure may include anywhere from about 200 to about 900 or more channels or cells per square inch, depending upon the type of exhaust treating device. A diesel particulate trap differs from a catalyst structure in that each channel or cell within the particulate trap is closed at one end or the other. In the diesel particulate trap, particulate is collected from exhaust gases in the porous structure until regenerated by a high-temperature burnout process. Any known catalyst support structures for catalytic converters or diesel particulate traps may be utilized in the exhaust gas treatment device. Non-automotive applications for the mounting mat of the present invention may include catalytic converters for chemical industry emission (exhaust) stacks.

Catalytic converter 10 may include a generally tubular housing 12 formed of two pieces of metal, e.g. high-temperature resistant steel, held together by flange 16. Alternatively, the housing may include a preformed canister into which a mounting mat-wrapped catalyst support structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile catalyst support structure, such as a frangible ceramic monolith 18, which is supported and restrained within housing 12 by the mounting mat 20, to be further described. Monolith 18 includes a plurality of gas pervious passages that extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible. Any known monoliths may be used in combination with the housing and mounting mat.

The monolith is spaced from its housing by a distance or a gap, which will vary according to the type and design of the exhaust gas treatment device utilized, for example, a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the catalyst support structure, protecting the fragile structure from mechanical shock across a wide range of exhaust gas treatment device operating temperatures.

Figure 2:
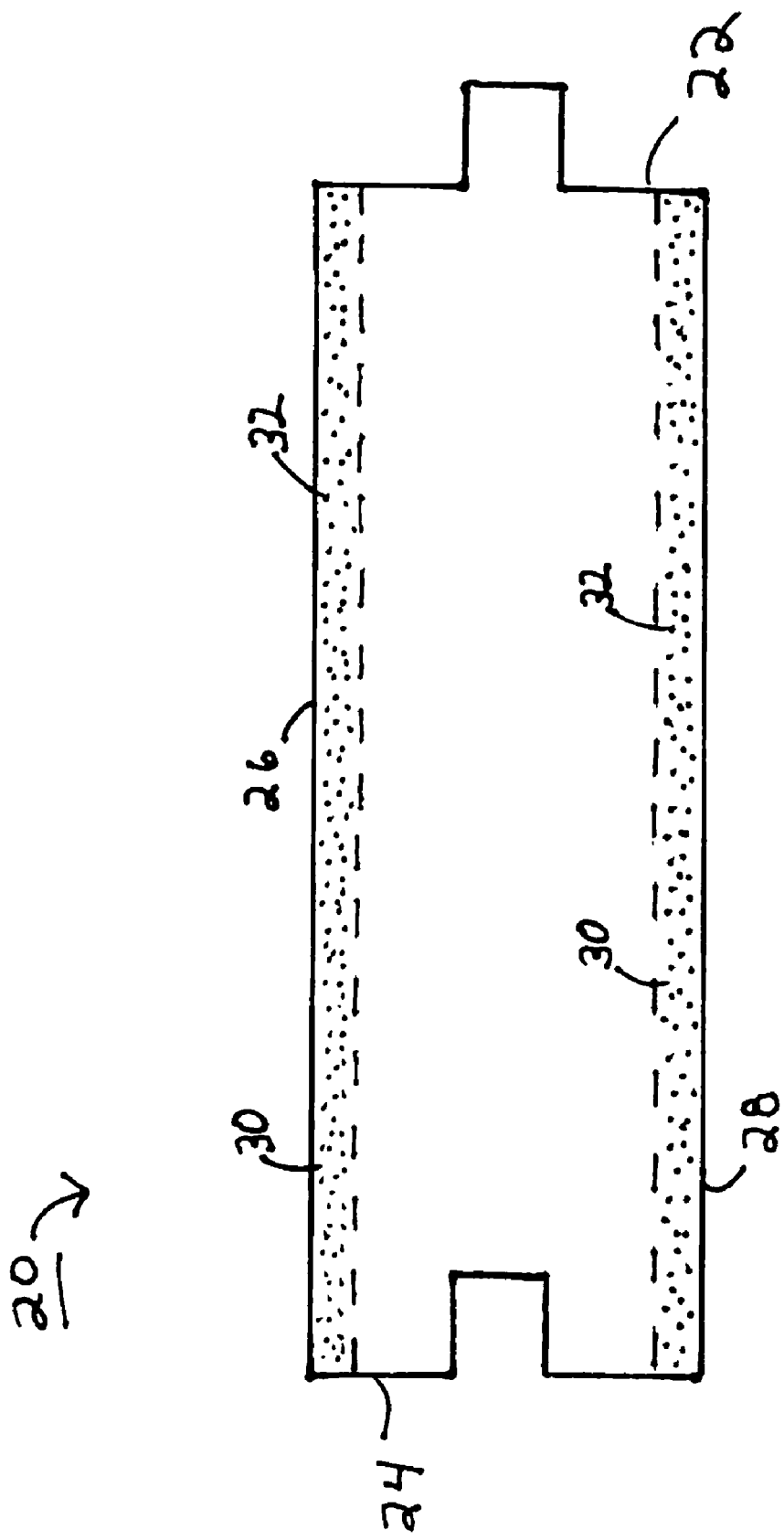
FIG. 2 shows a planar view of a mounting mat having a tongue-and-groove configuration.

Turning to FIG. 2, an illustrative mounting mat 20 is shown. The mounting mat 20 is a homogenous mat of high-temperature resistant inorganic fibers that has been die-stamped to achieve a mounting mat having a tongue-and-groove configuration. The mounting mat 20 contains a leading edge 22 and a trailing edge 24. The mounting at also includes opposite lateral edges 26, 28 that may be exposed to hot exhaust emissions. A flexible edge protectant 32 is applied to first major surface 30 and lateral edges 26 and 28 of the mounting mat 20 to protect the mounting mat 20 from hot emission gas edge erosion and degradation during operation of the catalytic converter. The flexible edge protectant may also be applied to portions of the second major surface (not shown) of the mat adjacent to the lateral edges.

Figure 3:
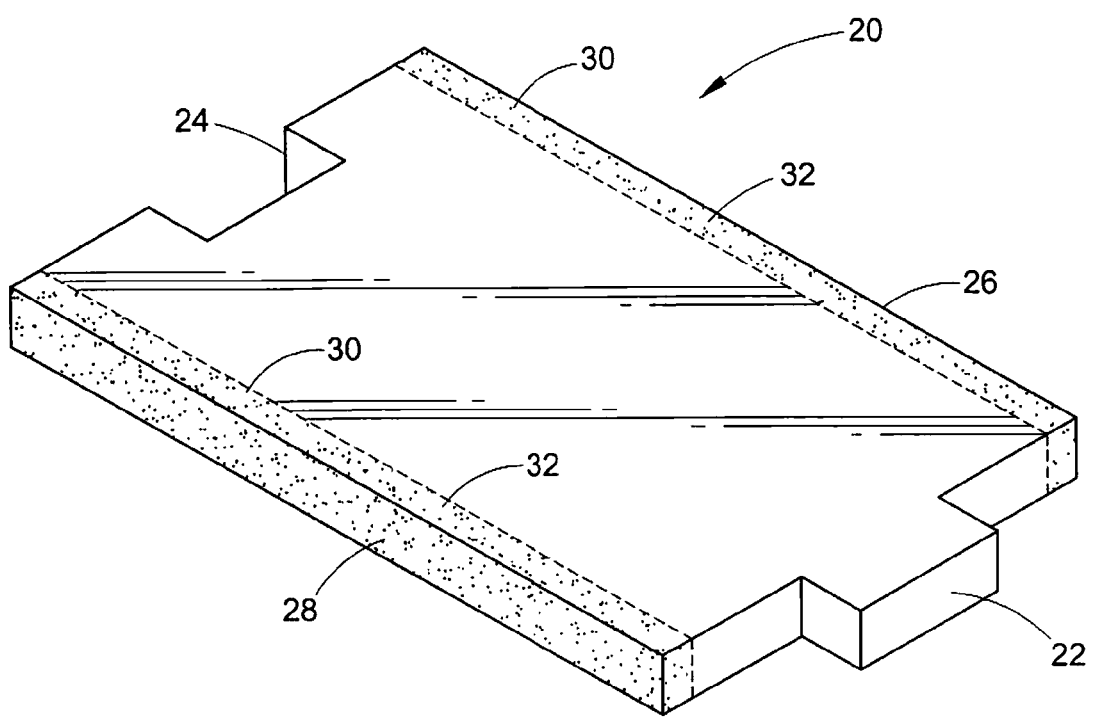
FIG. 3 shows a perspective view of a mounting mat having a tongue-and-groove configuration treated with flexible edge protectant.

Turning to FIG. 3, an illustrative mounting mat 20 is shown. The mounting mat 20 is a homogenous mat of high-temperature resistant inorganic fibers that has been die-stamped to achieve a mounting mat have a tongue-and-groove configuration. The mounting mat 20 contains a leading edge 22 and a trailing edge 24. The mounting at also includes opposite lateral edges 26 and 28 that may be exposed to hot exhaust emissions. A flexible edge protectant 32 is applied to lateral edges 26 and 28 and to first major surface 30 of the mounting mat 20 to protect the mounting mat 20 from hot emission gas edge erosion and degradation during operation of the catalytic converter. The edge protectant 32 may also be applied to portions of the second major surface (not shown) of the mat adjacent to the lateral edges.

In general, the mounting mat includes inorganic fibers having a flexible edge protectant adsorbed on a portion thereon, optionally at least one type of intumescent material, and optionally at least one type of organic binder. The term "adsorbed" means that the edge protection is disposed on the surfaces of the lateral edges and optionally portions of the first and second major surfaces that are adjacent to the lateral edges, and/or the edge protectant material has penetrated into at least a portion of the thickness of the mounting mat along the lateral edges of the mat and optionally portions of the first and second major surfaces that are adsorbed on the lateral surfaces of the mat. Upon the burning out of the polymer from the edge protectant, the gas erosion resisting agent is left behind to protect the edges of the mounting mat from degradation from hit impinging gases. Where the gas erosion resisting material has penetrated the thickness of the mounting mat, those portions of the mounting mat become densified and resistant to hot gas erosion.

The edge protectant material is adsorbed to a portion of at least the leading edge and trailing edge of mounting mat 20. According to certain embodiments, the edge protectant may be adsorbed to a portion of at least one of the leading and trailing edges of mounting mat 20. According to other embodiments, the edge protectant may be adsorbed to a portion of both the leading and trailing edges of the mounting mat. According to other embodiments, the edge protectant may be adsorbed along the entire length of the edge of at least one of the leading and trailing edges of the mounting mat. According to further embodiments, the edge protectant may be adsorbed along the entire length of both the leading and trailing edges of the mounting mat. The composition of the mounting mat is capable of protecting the edges of the mounting mat that are exposed to hot exhaust gas, to prevent edge erosion or premature decomposition of the mounting mat.

According to certain embodiments, the loading value of the flexible edge protectant adsorbed onto the mounting mat is from about 0.1 to about 2 ml/cm$^2$. According to other embodiments, the loading value of the flexible edge protectant adsorbed onto the mounting mat is from about 0.2 to about 0.8 ml/cm$^2$. According to other embodiments, the loading value of the flexible edge protectant adsorbed onto the mounting mat is from about 0.4 to about 0.6 ml/cm$^2$.

Any heat resistant inorganic fibers may be utilized in the construction of the mounting mat so long as the fibers can withstand the mounting mat forming process, can withstand the operating temperatures of the exhaust gas treatment devices, can provide the minimum thermal insulation and mechanical shock protection in holding pressure performance for holding the fragile structure within the exhaust gas treatment device housing at the anticipated operating temperatures. Without limitation, suitable inorganic fibers that may be used to prepare the mounting mat and exhaust gas treatment device include certain oxide fibers such as high alumina polycrystalline fibers and alumina-silicate fibers, alumina-magnesia-silica fibers, alkaline earth silicate fibers such as calcia-magnesia-silica fibers and magnesia-silica fibers, S-glass fibers, S2-glass fibers. E-glass fibers, quartz fibers, silica fibers and combinations thereof.

According to certain embodiments, the heat resistant inorganic fibers that are used to prepare the mounting mat comprise ceramic oxide fibers. Without limitation, suitable ceramic oxide fibers include alumina fibers, alumina-silica fibers, alumina-zirconia-silica fibers, zirconia-silica fibers, zirconia fibers and similar fibers. A useful alumina-silica ceramic fiber is commercially available from Unifrax I LLC (Niagara Falls, N.Y.) under the registered trademark FIBERFRAX. The FIBERFRAX ceramic fibers comprise the fiberization product of about 45 to about 75 weight percent alumina and about 25 to about 55 weight percent silica. The FIBERFRAX fibers exhibit operating temperatures of up to about 1540° C. and a melting point up to about 1870° C. The FIBERFRAX fibers are easily formed into high-temperature resistant sheets, papers, plies and mats. The alumina/silica fibers may comprise from about 45 weight percent to about 60 weight percent alumina and about 40 weight percent to about 55 weight percent silica. The alumina/silica fiber may comprise about 50 weight percent alumina and about 50 weight percent silica.

The alumina/silica/magnesia glass fibers typically comprise from about 64 weight percent to about 66 weight percent silica, from about 24 weight percent to about 25 weight percent alumina, and from about 9 weight percent to about 10 weight percent magnesia. The E-glass fibers typically comprise from about 52 weight percent to about 56 weight percent silica, from about 16 weight percent to about 25 weight percent calcia, from about 12 weight percent to about 16 weight percent alumina, from about 5 weight percent to about 10 weight percent boria, up to about 5 weight percent magnesia, up to about 2 weight percent of sodium oxide and potassium oxide and trace amounts of iron oxide and fluorides, with a typical composition of 55 weight percent silica, 15 weight percent alumina, 7 weight percent boria, 3 weight percent magnesia, 19 weight percent calcia and traces of the above mentioned materials.

According to certain embodiments, the alkaline earth silicate fibers used to prepare the mounting mat are heat resistant and biosoluble. Without limitation, suitable examples of biosoluble alkaline earth silicate fibers that can be used to prepare a mounting mat for an exhaust gas treatment device include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, which are incorporated herein by reference.

According to certain embodiments, the biosoluble alkaline earth silicate fibers may comprise the fiberization product of a mixture of oxides of magnesia and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX fibers generally comprise the fiberization product of about 70 to about 80 weight percent silica, about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silica fibers. According to certain embodiments, the calcia-magnesia-silica fibers comprise the fiberization product of about 45 to about 90 weight percent silica, from greater than 0 to about 45 weight percent calcia, from greater than 0 to about 35 weight percent magnesia, and 10 weight percent or less impurities. Useful calcia-magnesia-silica fibers are commercially available from Unifrax I LLC (Niagara Falls, N.Y.) under the registered trademark INSULFRAX. INSULFRAX fibers generally comprise the fiberization product of about 61 to about 67 weight percent silica, from about 27 to about 33 weight percent calcia, and from about 2 to about 7 weight percent magnesia. Other suitable calcia-magnesia-silica fibers are commercially available from Thermal Ceramics (Augusta, Ga.) under the trade designations SUPERWOOL 607 and SUPERWOOL 607 MAX. SUPERWOOL 607 fibers comprise about 60 to about 70 weight percent silica, from about 25 to about 35 weight percent calcia, and from about 4 to about 7 weight percent magnesia, and trace amounts of alumina. SUPERWOOL 607 MAX fibers comprise about 60 to about 70 weight percent silica, from about 16 to about 22 weight percent calcia, and from about 12 to about 19 weight percent magnesia, and trace amounts of alumina.

In certain embodiments, the mounting mat 20 may comprise one or more non-intumescent plies of melt-formed, amorphous, high-temperature resistant leached glass fibers having a high silica content and, optionally a binder or other fibers suitable for acting as a binder. Glass fibers may be leached in any manner and using any techniques known in the art. Generally, leaching can be accomplished by subjecting the melt formed glass fibers to an acid solution or other solution suitable for extracting the non-siliceous oxides and other components from the fibers. A more detailed description of various known leaching techniques are discussed in U.S. Pat. No. 2,624,658 and European Patent Application Publication No. 0973697, although the leaching techniques are not limited to them. By the term "high silica content." it is meant that the fibers contain more silica than any other compositional ingredient in the fibers. In fact, as discussed below, it will be appreciated that the silica content of these fibers after leaching are preferably greater than any other glass fibers containing silica, including S-glass fibers, except crystalline quartz derived fibers or pure silica fibers.

Suitable silica fibers useful in the production of a mounting mat for an exhaust gas treatment device include those leached glass fibers available from BelChem Fiber Materials GmbH, Germany, under the trademark BELCOTEX, from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C. and are typically shot free and binder free.

The REFRASIL fibers, like the BELCOTEX fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

In certain embodiments, the mounting mat 20 may comprise an intumescent mounting mat. The intumescent mounting mat 20 includes an intumescent material such as unexpanded vermiculite, ion-exchanged vermiculite, heat treated vermiculite, expandable graphite, hydrobiotite, water-swelling tetrasilicic fluorine mica, alkaline metal silicates, or mixtures thereof. The mounting mat may include a mixture of more than one type of intumescent material. According to certain embodiments, the intumescent material included in the mounting mat may comprise a mixture of unexpanded vermiculite and expandable graphite in a relative amount of about 9:1 to about 1:2 vermiculite:graphite, as described in U.S. Pat. No. 5,384,188.

As noted previously, the mounting mats may or may not include a binder separate from the flexible edge protectant. When a binder is used, the components may be mixed to form a mixture or slurry. The slurry of fibers, optionally intumescent material, and binder is then formed into a mat structure and the binder is removed, thereby providing a mounting mat containing substantially only the high-temperature resistant inorganic fibers and optionally an intumescent material.

Suitable binders include organic binders, inorganic binders and mixtures of these two types of binders. According to certain embodiments, the mounting mat includes one or more organic binders. The organic binders may be provided as a solid, a liquid, a solution, a dispersion, a latex, an emulsion, or similar form. The organic binder may comprise a thermoplastic or thermoset binder, which after cure is a flexible material that can be burned out of an installed mounting mat. Examples of suitable organic binders include, but are not limited to acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters.

The organic binder may be included in the mounting mat in an amount of greater than 0 to about 20 weight percent, from about 0.5 to about 15 weight percent, from about 1 to about 10 weight percent and from about 2 to about 8 weight percent, based on the total weight of the mounting mat.

The mounting mat may include polymeric binder fibers instead of, or in addition to, a resinous or liquid binder. These polymeric binder fibers may be used in amounts ranging from greater than 0 to about 20 percent by weight, from about 1 to about 15 weight percent, and from about 2 to about 10 weight percent, based upon 100 percent by weight of the total composition, to aid in binding the heat resistant inorganic fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof. Bi-component fibers comprising a core sheath construction may be used as the binder fiber.

Typically, the organic binder is a sacrificial binder employed to initially bond the fibers together. By "sacrificial," it is meant that the organic binder will eventually be burned out of the mounting mat, leaving an integral mounting mat of the inorganic fibers and optionally the intumescent material for supporting for supporting the catalyst support structure within the metallic housing.

According to certain illustrative embodiments, the mounting mat is integral. By "integral," it is meant that, after manufacture, the mounting mat has a self-supporting structure, needing no reinforcing or containment layers of fabric, plastic or paper, (including those which are stitch-bonded to the mat) and can be handled, manipulated or installed without disintegration.

In addition to organic binders, the mounting mats may also include inorganic binder material. Without limitation, suitable inorganic binder materials include colloidal dispersions of alumina, silica, zirconia, and mixtures thereof.

Methods of applying binder or the edge protectant to the mat include coating, dipping, immersing, submersing, rolling, brushing, splashing, spraying, and the like. With respect to the application of binder to the mat, in a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

During operation of an exhaust gas treatment device 10, hot exhaust emissions enter the inlet 14 of the exhaust gas treatment device 10 and exit through the outlet (not shown). These emissions cause the leading edge 26 located on the inlet 14 side of the mounting mat and the trailing edge 28 located on the outlet side (not shown), which have not been treated with the edge protectant, to erode over time resulting in overall degradation of the mounting mat. The application of the edge protectant to the mounting mat 20 protects the mat 20 from erosion attributable to high-temperature exhaust gas emissions.

The liquid edge protectant containing the flexible polymer and gas erosion resisting agent is applied to the mounting mat when it is made, and it remains flexible enough after the substantially drying the edge protectant to allow the mat to be wrapped about at least a portion of the fragile catalyst support structure and installed within the exhaust gas treatment device without interfering with its installation or function. The mounting mat is not subject to increased cracking or inflexibility that would cause difficulty with the assembly within the housing, which is normally associated with rigidizing edge protectant materials.

In light of the disadvantages of current solutions to edge erosion, the present mounting mat also includes an edge protectant treatment that is effective against edge erosion and degradation and simpler to apply. The edge protectant treatment may be applied to either intumescent or non-intumescent mounting mats comprising any, of the inorganic fibers mentioned above. The edge protectant treatment is applied to the mounting mat before the mat is wrapped around the catalyst support, but may be applied at any step along the manufacturing process of the exhaust gas treatment device including after assembly of the mounting mat within the housing. In the past, silica cloth has been wrapped around the edges of the mounting mat to provide edge protection. This results in increased thickness of the mounting mat and a decrease in mat flexibility. Application of the present edge protectant treatment, however, does not cause the mounting mat to gain thickness and allows the mounting mat to retain most of its original flexibility. The flexible edge protectant is also advantageous over use of a non-intumescent material edge protectant in that there is no need for adhesive tape or other joining means to be used to hold the separate and distinct parts of the mounting mat together.

In certain embodiments, edge protectant treatment may be applied by contacting a portion of the mounting mat with a bath of liquid edge protectant. One method of applying the edge protectant treatment involves dipping at least the edge portions of a single homogeneous mounting mat into a reservoir containing the edge protectant solution. The mounting mat adsorbs the solution and becomes at least partially saturated with edge protectant treatment. The length of the mounting mat dipped into the edge protectant solution may vary depending on the embodiment and is sufficient to impart hot gas erosion resistance on the mounting mat. The dipping of the mounting mat into the reservoir preferably occurs at a particular depth so that a portion of the leading or trailing edges of the mounting mat is treated with edge protectant. The edge protectant treatment is adsorbed by the fibers of the mounting mat through capillary action.

The mounting mat is then subjected to a process that removes at least a portion of the moisture from the edge protectant treatment either before or after it is assembled within the exhaust gas treatment device to obtain a mounting mat with a substantially dry flexible edge protectant thereon. With reference to the edge protectant, the term "substantially dry", means that the moisture content of the edge protectant is about 10 percent of the original moisture content of the edge protectant before drying. According to certain embodiments, the term "substantially dry" means that the moisture content of the edge protectant is about 5 percent of the original moisture content of the edge protectant before drying. According to further embodiments, the term "substantially dry" means that the moisture content of the edge protectant is about 2 percent of the original moisture content of the edge protectant before drying.

According to certain embodiments, the mounting mat with saturated edge protectant is subjected to the drying process before its assembly within the exhaust gas treatment device. Drying may be forced by the application of heat and high air movement. One method of drying placing the mounting mat treated with flexible edge protectant in a convection oven with an air temperature of about 200° C. or more. The drying process allows for the evaporation of water or other liquid in the edge protectant solution. In drying, the gas erosion resisting agent, such as silica solids, migrate with the liquid vehicle to the points where vaporization occurs and are deposited at those points to a substantially greater degree than elsewhere. This means that the silica solids tend to concentrate at the exposed ends of the mounting mat and to a lesser extent at the interfaces of the mounting mat 20 and the tubular housing 12 or preformed canister and the monolith 18. Selective heating, instead of often drying, can be used, if desired, to control the areas of deposition of silica. After drying, the mounting mat with edge protectant remains flexible enough to be wrapped around a monolith to allow for easy assembly of the parts of the exhaust gas treatment device without cracking or splitting of the mat or otherwise interfering with either the installation or function. The mounting mat treated with edge protectant maintains sufficient flexibility to be positioned about the monolithic fragile support structure. In fact, the mounting mat with edge protectant remains substantially as flexible as the homogeneous underlying mounting mat material and will therefore not alter the use of the mounting mat product. This allows the canning operation to proceed more systematically, allowing for simple wrapping of the mounting mat around the fragile support structure without the use of any additional steps after assembly to perfect the mounting mat for edge erosion protection Another method of applying edge protectant treatment to the mounting mat involves impregnating or injecting the edge protectant treatment into the mounting mat either before or after the mounting mat has been assembled within the housing of the exhaust gas treatment device. This method involves injecting the edge protectant treatment into at least one of the exposed leading or trailing edges of the mounting mat with a needle. The impregnated or injected edge protectant treatment will then distribute itself throughout the mounting mat. Normal operating temperatures of the exhaust gas treatment device, along with other drying methods may be used to facilitate the drying process of the mounting mat making the mounting mat resistant to edge erosion.

According to certain embodiments, the edge protectant treatment comprises a latex and the gas erosion resisting agent. According to certain embodiments, the edge protectant solution is an emulsion where the dispersed phase comprises an elastomer within a continuous phase of water, and the gas erosion resisting agent. According to certain embodiment, the elastomer thermally decomposes leaving behind the gas erosion resisting agent, such as high temperature resistant inorganic particles. According to certain embodiments, these particles are small enough to penetrate the surface of the edge and major surfaces of the mounting mat fibers without penetrating the fiber to a significant depth that colloidal silica would. For example, inorganic particles such as fumed silica which has a particle size of approximately less than $2.6 \times 10^{-3}$ mm$^2$ may achieve such surface penetration.

According to certain embodiments, without limitation, the edge protectant comprises a polysiloxane emulsion. Without limitation, a suitable polysiloxane emulsion is commercially available under the trade designation Dow 84. Dow 84 is a water based polysiloxane that is supplied as an opaque emulsion. It contains a significant amount of silica solids yet remains flexible when it is dried into a film. Dow 84 is commercially available from the Dow Corning Corporation (Midland, Mich.).

Other ingredients that may be used to develop edge protectant treatment include but are not limited to colloidal silica, various clays, various polymers, etc. Optionally, a surfactant may be included as a component of the edge protectant bath to facilitate absorption of the edge protectant liquid into the mat. Use of a surfactant may allow easier application of the edge protectant treatment by facilitating absorption of the edge protectant liquid into the mat.

Once the mounting mat is formed with the substantially dried flexible edge protectant adsorbed thereon, it may be die cut to the final shape that will be used for a particular exhaust gas treatment device. Application of edge protectant treatment involves dipping the part edges of the die cut mounting mat into the edge protectant bath. The mounting mat, having been treated with edge protectant, remains flexible enough to be wrapped around at least a portion of a fragile structure adapted to treat exhaust gases. The fragile structure, wrapped with a mounting mat treated with edge protectant, is then disposed within part of the housing of the exhaust gas treatment device. After disposing the fragile structure wrapped with a mounting mat treated with edge protectant within the housing, the housing is then assembled and sealed to form the exhaust gas treatment device.

EXAMPLES

The following examples are intended to merely further exemplify illustrative embodiments of the mounting mat and exhaust gas treatment device. It should be understood that these examples are for illustration only and should not be considered as limiting the claimed mounting mat, exhaust gas treatment device, or methods in any respect.

The examples are based on an inorganic fiber-based mounting mat containing refractory alumino-silicate fibers commercially available from Unifrax I LLC Niagara Falls, N.Y. under XPE®-AV2. XPE®-AV2 is an intumescent expanding mat designed to function as mechanical support for the ceramic substrate and act as an exhaust gas seal, while providing thermal insulation within an exhaust gas treatment device.

Durability Test

Three mounting mat samples of XPE®-AV2 were prepared and tested to evaluate the effect of the flexible edge protectant has on the performance characteristics and edge erosion of the mounting mat. Samples of XPE®-AV2 mounting mat were die cut into sizes measuring 1.5"×2.0". These samples were then weighed to calculate the gap bulk density (GBD) of the mounting mat and to calculate the necessary gap to be left by the mounting plates which are positioned around the first and second major opposite facing surfaces of the mounting mat during the test. The gap left by the mounting plates is used to accommodate the gap bulk density or thickness of the mounting mat and approximate the distance or gap left between the outer surface of the fragile catalyst support structure and the inner surface of the housing for holding the mounting mat within the exhaust gas treatment device.

The samples were mounted within a fixture and heated at 600° C. for 30 minutes, cooled down to 100° C. and reheated at 600° C. for another 30 minutes before being allowed to cool to ambient temperature. This heating results in the burning out of organic polymer portion of the edge protectant from the mounting mat.

The samples were then removed from the fixture and placed within a mounting fixture comprising two opposing mounting plates for holding the first and second major opposite facing surfaces of the mounting mat. The mounting fixture/mounting mat assembly was then placed inside an erosion durability tester for testing of gas erosion. During the test, a motor operates to direct a pulsating stream of gas through an orifice within the mounting plate of the mounting fixture to an exposed portion of the mounting mat. Two of the samples were tested at an air pressure of 1.60 bar, a motor speed of 666 rpm, and ambient temperature for 50 minutes while one sample was tested at an air pressure of 1.60 bar, a motor speed of 666 rpm, and ambient temperature for 24 hours. The samples were then removed from the erosion durability tester and measured for erosion.

Measuring erosion was accomplished by filling any erosion-caused void within the samples with tabular alumina and weighing the amount of tabular alumina filled within the voids of each sample in grams. Durability was calculated using the inverse density factor of tabular alumina of 1.67 cm$^3$/g to determine the average value in volume loss measured in cubic centimeters (cc).

Example 1

Example 1 shows the gap bulk density and erosion durability after testing of an XPE®-AV2 mat not treated with flexible edge protectant. A 1.5"×2" specimen was cut from the fiber mat and heated as described above. The fiber mat sample was positioned within an erosion durability tester as described above. The XPE®-AV2 fiber samples were subjected to a pulsating gas stream of 1.60 bar for 50 minutes at ambient temperature to evaluate performance and mat erosion. After testing, the XPE®-AV2 fiber sample exhibited a gap bulk density of 0.58 g/cm$^3$ and an erosion or volume loss of 0.14 cm$^3$.

Example 2

Example No. 2 was an inorganic fiber-based mounting mat formed in accordance with Example No. 1, with the exception that the XPE®-AV2 fiber mat was treated with a flexible edge protectant prior to heating the mounting mat. The XPE®-AV2 fiber sample treated with heat and flexible edge protectant was subjected to a pulsating gas stream of 1.60 bar for 50 minutes at ambient temperature to evaluate performance and mat erosion. After testing, the treated XPE®-AV2 fiber sample exhibited a gap bulk density of 0.58 g/cm$^3$. The mat did not exhibit any erosion or volume loss.

Example 3

Example No. 3 was an inorganic fiber-based mounting mat formed in accordance with Example No. 1, with the exception that the XPE®-AV2 fiber mat was treated with a flexible edge protectant prior to heating the mounting mat as described above. The XPE®-AV2 fiber sample treated with flexible edge protectant was subjected to a pulsating gas stream of 1.60 bar for 24 hours at ambient temperature to evaluate performance and mat erosion as described above. After testing the treated XPE®-AV2 fiber sample exhibited a gap bulk density of 0.58 g/cm$^3$. The mat did not exhibit any erosion or volume loss.

The results of the testing of Examples 1, 2 and 3 are reported in Table 1 below.

TABLE 1

| | Sample | | Gap Bulk Density (g/cc) | Erosion Durability (Volume Loss-cc) |
|---|---|---|---|---|
| Standard 50 Minute Test | Example 1 | XPE-AV2 | 0.58 | 0.14 |
| | Example 2 | XPE-AV2 with Flexible Edge Protectant | 0.58 | 0 |

TABLE 1-continued

| | Sample | | Gap Bulk Density (g/cc) | Erosion Durability (Volume Loss-cc) |
|---|---|---|---|---|
| Extended 24 Hour Test | Example 3 | XPE-AV2 with Flexible Edge Protectant | 0.58 | 0 |

These results show that the application of a flexible edge protectant material is suitable for minimizing or avoiding hot gas erosion of the mounting mat.

While the mounting mat and exhaust gas treatment device have been described above in connection with certain illustrative embodiments, it is to be understood that other similar embodiments may be used or modifications and additions may be made to the described embodiments for performing the same function without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the mounting mat and exhaust gas treatment device should not be limited to any single embodiment, but rather construed in breadth and scope in accordance with the recitations of the attached claims.

We claim:

1. A mounting mat for an exhaust gas treatment device comprising a mat of inorganic fibers comprising first and second major opposite facing surfaces, leading and trailing edges, and opposite lateral edges, wherein at least a portion of at least one of said opposite lateral edges includes a substantially dry flexible edge protectant comprising: (i) a polymer and a gas erosion resisting agent adsorbed thereon; or (ii) an elastomer that thermally decomposes leaving a gas erosion resisting agent adsorbed thereon.

2. The mounting mat of claim 1, wherein said mat comprises at least one of organic binder and inorganic binder.

3. The mounting mat of claim 2, wherein said organic binder comprises an acrylic latex.

4. The mounting mat of claim 2, wherein said inorganic binder comprises colloidal silica, colloidal alumina, colloidal zirconia and mixtures thereof.

5. The mounting mat of claim 2, wherein the mounting mat further comprises a clay.

6. The mounting mat of claim 5 wherein said clay is selected from the group consisting of attapulgite, ball clay, bentonite, hectorite, kyanite, kaolinite, montmorillonite, palygorskite, saponite, sepiolite, silimanite and combinations thereof.

7. The mounting mat of claim 1, wherein said inorganic fibers are selected from the group consisting of high alumina polycrystalline fibers, refractory ceramic fibers, glass fibers, biosoluble fibers, quartz fibers, silica fibers, and combinations thereof.

8. The mounting mat of claim 7, wherein said ceramic fibers comprise alumino-silicate fibers comprising the fiberization product of about 45 to about 75 weight percent alumina and about 25 to about 55 weight percent silica.

9. The mounting mat of claim 7, wherein said biosoluble fibers comprise the fiberization product of about 65 to about 86 weight percent silica and from about 14 to about 35 weight percent magnesia.

10. The mounting of claim 9, wherein the biosoluble fibers comprise the fiberization product of about 70 to about 86 weight percent silica, about 14 to about 30 weight percent magnesia and about 5 weight percent or less impurities.

11. The mounting mat of claim 10, wherein the biosoluble fibers comprise the fiberization product of about 70 to about 80 weight percent silica, about 18 to about 27 weight percent magnesia and 0 to 4 weight percent impurities.

12. The mounting mat of claim 7, wherein the biosoluble fibers comprise the fiberization product of about 45 to about 90 weight percent silica, greater than 0 to about 45 weight percent calcia, and greater than 0 to about 35 weight percent magnesia.

13. The mounting mat of claim 12, wherein the biosoluble fibers comprise the fiberization product of about 60 to about 70 weight percent silica, from about 16 to about 35 weight percent calcia, and from about 4 to about 19 weight percent magnesia.

14. The mounting mat of claim 13, wherein the biosoluble fibers comprise the fiberization product of about 61 to about 67 weight percent silica, from about 27 to about 33 weight percent calcia, and from about 2 to about 7 weight percent magnesia.

15. The mounting mat of claim 1, wherein said flexible edge protectant comprises a water based silicone emulsion.

16. The mounting mat of claim 15, wherein said gas erosion resisting agent comprises an inorganic particulate.

17. The mounting mat of claim 16, wherein said inorganic particulate comprises alumina, silica, zirconia, and mixtures thereof.

18. The mounting mat of claim 17, wherein said inorganic particulate comprises amorphous silica.

19. The mounting mat of claim 18, wherein the particle size of the inorganic particulate is from about 5 to about 100 nanometers.

20. The mounting mat of claim 15, wherein said edge protectant further comprises a surfactant.

21. The mounting mat of claim 1, further comprising an intumescent material.

22. The mounting mat of claim 21, wherein said intumescent material is selected from the group consisting of unexpanded vermiculite, ion exchanged vermiculite, heat treated vermiculite, expandable graphite, hydrobiotite, water-swelling tetrasilicic fluorine mica, alkaline metal silicates, or mixtures thereof.

23. The mounting mat of claim 22, wherein said intumescent material comprises unexpanded vermiculite.

24. An exhaust gas treatment device comprising:
a housing;
a mat of inorganic fibers comprising first and second major opposite facing surfaces, leading and trailing edges, and opposite lateral edges, wherein at least a portion of at least one of said opposite lateral edges includes a substantially dry flexible edge protectant comprising: (i) a polymer and a gas erosion resisting agent adsorbed thereon; or (ii) an elastomer that thermally decomposes leaving a gas erosion resisting agent adsorbed thereon; and
a fragile catalyst support structure resiliently mounted within said housing by said mounting mat.

25. The exhaust gas treatment device of claim 24, wherein said housing has an inlet at one end and an outlet at an opposite end through which exhaust gases flow; and wherein said catalyst support structure has an outer surface, an inlet end surface at one end in communication with said inlet of said housing and an outlet end surface at an opposite end in communication with said outlet end of said housing.

26. The exhaust gas treatment device of claim 24, wherein said mat comprises at least one of organic binder and inorganic binder.

27. The exhaust gas treatment device of claim 26, wherein said organic binder comprises an acrylic latex.

28. The exhaust gas treatment device of claim 26, wherein said inorganic binder comprises colloidal silica.

29. The exhaust gas treatment device of claim 26, wherein the mounting mat further comprises a clay.

30. The exhaust gas treatment device of claim 29, wherein said clay is selected from the group consisting of attapulgite, ball clay, bentonite, hectorite, kyanite, kaolinite, montmorillonite, palygorskite, saponite, sepiolite, silimanite or combinations thereof.

31. The exhaust gas treatment device of claim 24, wherein said inorganic fibers are selected from the group consisting of high alumina polycrystalline fibers, refractory ceramic fibers, glass fibers, biosoluble fibers, quartz fibers, silica fibers, and combinations thereof.

32. The exhaust gas treatment device of claim 31, wherein said ceramic fibers comprise alumino-silicate fibers comprising the fiberization product of about 45 to about 75 weight percent alumina and about 25 to about 55 weight percent silica.

33. The exhaust gas treatment device of claim 31, wherein said biosoluble fibers comprise the fiberization product of about 65 to about 86 weight percent silica and from about 14 to about 35 weight percent magnesia.

34. The exhaust gas treatment device of claim 33, wherein the biosoluble fibers comprise the fiberization product of about 70 to about 86 weight percent silica, about 14 to about 30 weight percent magnesia and about 5 weight percent or less impurities.

35. The exhaust gas treatment device of claim 34, wherein the biosoluble fibers comprise the fiberization product of about 70 to about 80 weight percent silica, about 18 to about 27 weight percent magnesia and 0 to 4 weight percent impurities.

36. The exhaust gas treatment device of claim 31, wherein the biosoluble fibers comprise the fiberization product of about 45 to about 90 weight percent silica, greater than 0 to about 45 weight percent calcia, and greater than 0 to about 35 weight percent magnesia.

37. The exhaust gas treatment device of claim 36, wherein the biosoluble fibers comprise the fiberization product of about 60 to about 70 weight percent silica, from about 16 to about 35 weight percent calcia, and from about 4 to about 19 weight percent magnesia.

38. The exhaust gas treatment device of claim 37, wherein the biosoluble fibers comprise the fiberization product of about 61 to about 67 weight percent silica, from about 27 to about 33 weight percent calcia, and from about 2 to about 7 weight percent magnesia.

39. The exhaust gas treatment device of claim 24, wherein said flexible edge protectant comprises a water based silicone emulsion.

40. The exhaust gas treatment device of claim 39, wherein said gas erosion resisting agent comprises an inorganic particulate.

41. The exhaust gas treatment device of claim 40, wherein said inorganic particulate comprises alumina, silica, zirconia and mixtures thereof.

42. The exhaust gas treatment device of claim 41, wherein said inorganic particulate comprises amorphous silica.

43. The exhaust gas treatment device of claim 41, wherein the particle size of the inorganic particulate is from about 5 to about 100 nanometers.

44. The exhaust gas treatment device of claim 39, wherein said edge protectant further comprises a surfactant.

45. The exhaust gas treatment device of claim 24, wherein said mounting mat further comprises an intumescent material.

46. The exhaust gas treatment device of claim 45, wherein said intumescent material is selected from the group consisting of unexpanded vermiculite, ion exchanged vermiculite, heat treated vermiculite, expandable graphite, hydrobiotite, water-swelling tetrasilicic fluorine mica, alkaline metal silicates, or mixtures thereof.

47. The exhaust gas treatment device of claim 46, wherein said intumescent material comprises unexpanded vermiculite.

48. The exhaust gas treatment device of claim 24, wherein the device is a catalytic converter, diesel particulate trap, or a NOx trap.

49. A method of making a mounting mat for an exhaust gas treatment device comprising:
   applying a liquid flexible edge protectant to a least a portion of at least one edge of mounting mat comprising inorganic fibers, wherein the liquid flexible edge protectant adsorbs onto the at least a portion of the at least one edge of the mounting mat, wherein the liquid flexible edge protectant comprises: (i) a polymer and a gas erosion resisting agent; or (ii) an elastomer that thermally decomposes leaving a gas erosion resisting agent; and
   removing at least a portion of said liquid from said edge protectant.

50. The method of claim 49 wherein said removing said liquid comprises substantially drying at ambient temperature.

51. The method of claim 50, wherein said removing of said liquid comprises substantially drying by heating said mounting mat.

52. The method of claim 51, wherein said heating comprising heating said mat in a convection oven at a temperature from about 100 to about 200 degrees Celsius.

53. The method of claim 52, wherein selective heating is used to control the areas of deposition of said edge protectant on said mounting mat.

54. The method of claim 49, wherein after said removing of said liquid the moisture content of the edge protectant is about 10 percent of the original moisture content of the edge protectant.

55. The method of claim 54, wherein after said removing of said liquid the moisture content of the edge protectant is about 5 percent of the original moisture content of the edge protectant.

56. The method of claim 55, wherein after said removing of said liquid the moisture content of the edge protectant is about 2 percent of the original moisture content of the edge protectant.

57. A method of making an exhaust gas treatment device comprising:
   wrapping at least a portion of a fragile catalyst structure adapted to treat exhaust gases with the mounting mat of any one of claim 1; and
   disposing the wrapped fragile structure within a housing.

* * * * *